(12) United States Patent
Li et al.

(10) Patent No.: US 7,786,411 B2
(45) Date of Patent: Aug. 31, 2010

(54) HEATED COMPUTER MOUSE

(75) Inventors: Wang-Jun Li, Shenzhen (CN);
Feng-Xia Lin, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 258 days.

(21) Appl. No.: 11/967,026

(22) Filed: Dec. 29, 2007

(65) Prior Publication Data

US 2009/0090706 A1    Apr. 9, 2009

(30) Foreign Application Priority Data

Oct. 9, 2007    (CN) .................. 2007 1 0201956

(51) Int. Cl.
*H05B 1/02* (2006.01)
(52) U.S. Cl. .............. 219/482; 219/538; 219/548; 219/494; 345/163
(58) Field of Classification Search ........... 219/482, 219/494, 489, 501, 502, 540, 538, 543, 548; 345/163
See application file for complete search history.

(56) References Cited

U.S. PATENT DOCUMENTS 4,418,272 A * 11/1983 Roller et al. ............. 219/541
6,133,556 A * 10/2000 Ramsey et al. ........... 219/521
6,646,226 B1 * 11/2003 Reitz ....................... 219/209
7,612,763 B2 * 11/2009 Schneider ................. 345/163
2002/0093485 A1 * 7/2002 Pappas ..................... 345/163
2007/0216646 A1 * 9/2007 Sun ......................... 345/163

FOREIGN PATENT DOCUMENTS

| CN | 2884305 Y | 3/2007 |
| CN | 2924636 Y | 7/2007 |
| DE | 102004031033 A1 | 1/2006 |

OTHER PUBLICATIONS

Xiao-Hong Jin, Application of Nano-powder in Marine Materials, Development and Application of Materials, Oct. 2001, vol. 16, Issue 5, China.

* cited by examiner

*Primary Examiner*—Mark H Paschall
(74) *Attorney, Agent, or Firm*—Frank R. Niranjan

(57) ABSTRACT

A heated mouse includes a shell having a heat-conductive part, a heating device installed in the shell, and an insulating layer. The heating device comprises a heat source. The insulating layer forms a closed space together with the heat-conductive part for accommodating the heat source therein. The heat-conductive part absorbs heat from the heat source. The heat-preserving mouse can not only heat the mouse, but also avoid reducing the lifespan of the mouse caused by overheat.

10 Claims, 2 Drawing Sheets

HEATED COMPUTER MOUSE

BACKGROUND

1. Field of the Invention

The present invention relates to input devices for use in computer systems, and particularly to a mouse having a heating function.

2. Description of Related Art

Mouses have become one of the most important input devices of computer systems. When users operate the mouses in a cold environment however, their hands may become cold and numb.

What is needed is to provide a heated mouse.

SUMMARY

An embodiment of a heated mouse includes a shell having a heat-conductive part, a heating device installed in the shell, and an insulating layer. The heating device comprises a heat source. The insulating layer forms a closed space together with the heat-conductive part for accommodating the heat source therein. The heat-conductive part absorbs heat from the heat source.

Other advantages and novel features of the present invention will become more apparent from the following detailed description of an embodiment when taken in conjunction with the accompanying drawings, in which:

DETAILED DESCRIPTION

Figure 1:
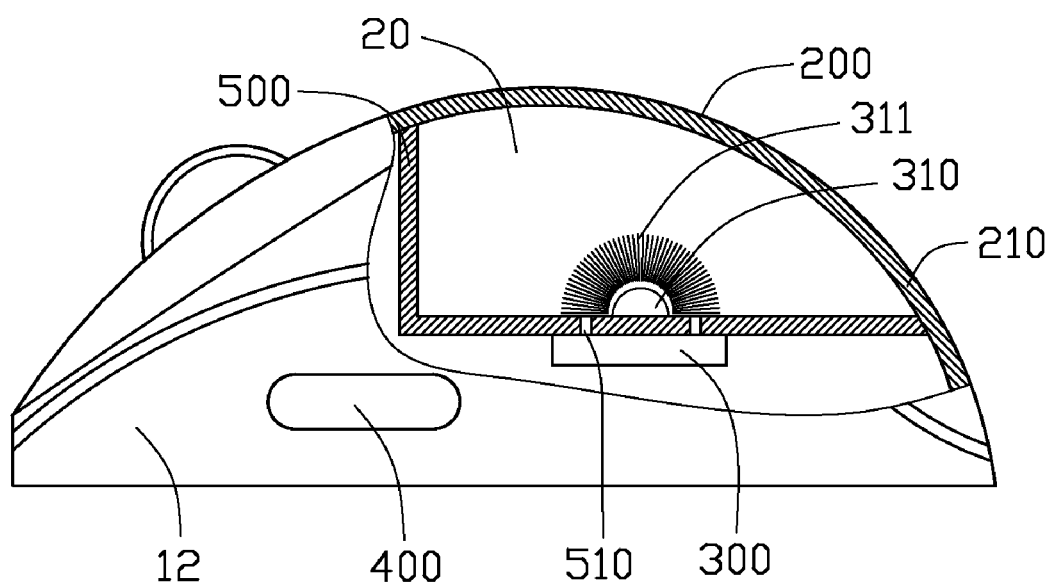
FIG. 1 is a partially cut away view of a heated mouse in accordance with an embodiment of the present invention.

Referring to FIG. 1, a heated mouse in accordance with an embodiment of the present invention includes a shell 12 having a heat-conductive part 200, a heating device 300 installed in the shell 12, a heat controlling apparatus 400, and an insulating layer 500 with two through holes 520 defined therein. The through holes 520 each allow only one wire extending therethrough. The insulating layer 500 and the heat-conductive part 200 form a closed space 20. A coating 210 is disposed on the inside surface of the heat-conductive part 200.

Figure 2:
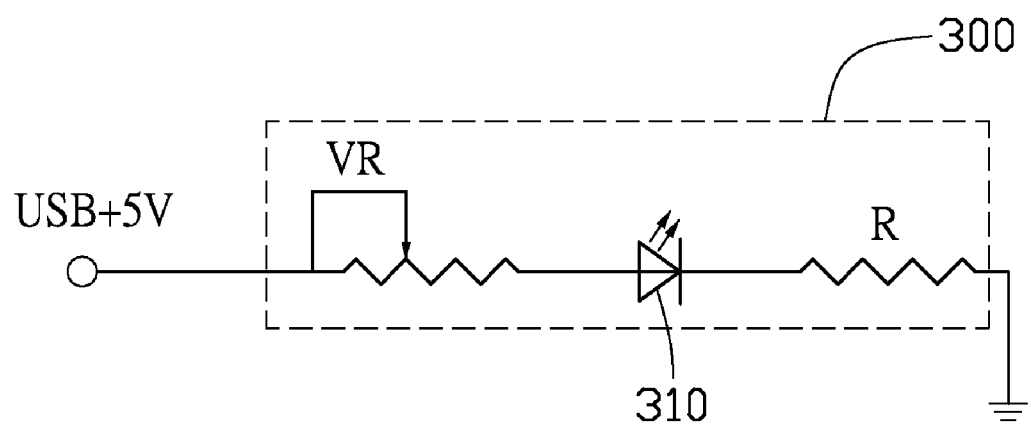
FIG. 2 is a circuit diagram of a heating device of the heated mouse of FIG. 1.

Referring to FIG. 2, the heating device 300 includes a variable resister VR, a heater 310 accommodated in the closed space 20, and a resistor R. The heater 310 is a light emitting diode (LED) that emits infrared rays (heat) 311. The anode of the LED 310 is connected to a power source via the variable resister VR, and the cathode of the LED 310 is grounded via the resistor R. In this embodiment, the anode and the cathode of the LED 310 are respectively connected to the variable resister VR and the resister R via two wires passed through the two through holes 520 respectively. The power source can be a 5V USB power source USB+5V. When the heated mouse is electrified by connecting to a host computer, the power source USB+5V provides a voltage to the heater 310, the heater 310 then radiates heat 311.

The heat 311 can be well absorbed by the coating 210, that makes the temperature of the heat-conductive part 200 rise. The heat-conductive part 200 is disposed at the top of the shell 12 in a raised shape for contacting with a user's palm. The heat 311 produced by the heater 310 is conducted to the heat-conductive part 200 for warming the user's hand. The insulating layer 500 can keep the components outside the closed space 20 in the shell 12 from being affected by the heat.

In this embodiment, the coating 210 is made of macromolecular-fiber and the composite powder of nanometer-alumina, ferric oxide, silicon oxide, titania, and the heat insulating layer 500 is made of metal-dielectric medium-composite membrane with nanometer-granules blended thereinto. Alternatively, the coating 210 and the insulating layer 500 can be other materials having the functions of heat absorption and heat insulation respectively.

The heat controlling apparatus 400 is connected to a sliding end of the variable resister VR to drive the sliding end of the variable resister VR to slide, to control the resistance of the variable resister VR. In this embodiment, the heat controlling apparatus 400 is a controlling wheel embedded in a sidewall of the shell 12. The resistance of the variable resister VR can be changed by turning the controlling wheel, thus adjusting the current through the LED 310. When the resistance of the variable resister VR is decreased, the heat 311 radiated by the LED 310 is hotter because more current passes through the LED 310, resulting in the heat-conductive part 200 becoming hotter. Conversely, raising the resistance of the variable resister VR, results in the temperature of the heat-conductive part 200 being reduced. When resistance of the variable resister VR is adjusted to lower the voltage to the LED 310 below the threshold voltage of the LED 310, the heater is turned off. The resistor R is used to prevent the heater 310 from being damaged by over-current.

The mouse can perform the function of heating by having the coating absorb the heat from the infrared emitting LED, and the insulating layer protects other components in the mouse from being affected by the heat.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A heated mouse comprising:
  a shell having a heat-conductive part;
  a heating device installed in the shell, the heating device comprising a heat source, the heat-conductive part absorbing the heat; and
  an insulating layer inside the shell forming a closed space together with the heat-conductive part for accommodating the heat source therein and for protecting components outside the closed space yet inside the shell from being heated by the heat source.

2. The heated mouse as claimed in claim 1, wherein the heat source is a light emitting diode (LED), the anode of the LED is connected to a power source via a resistor, and the cathode of the LED is grounded.

3. The heated mouse as claimed in claim 2, wherein the resistor is a variable resistor.

4. The heated mouse as claimed in claim 2, another resister is connected between the cathode of the LED and ground.

5. The heated mouse as claimed in claim 2, wherein the power source is a 5V USB power source.

6. The heated mouse as claimed in claim 3, further comprising a heat controlling apparatus connected to the variable resister to drive a sliding end of the variable resister to slide, and the controlling apparatus is embedded in a sidewall of the shell.

7. The heated mouse as claimed in claim 2, further comprising a coating disposed on the inside surface of the heat-conductive part, for absorbing the heat radiated by the LED.

8. The heated mouse as claimed in claim 7, wherein the LED is an infrared emitting LED.

9. The heated mouse as claimed in claim 7, wherein the coating is made of macromolecular-fiber and composite powder of nanometer-alumina, ferric oxide, silicon oxide, titania.

10. The heated mouse as claimed in claim 1, wherein the insulating layer is made of metal-dielectric medium-composite membrane with nanometer-granule blended thereinto.

\* \* \* \* \*